United States Patent [19]  
Gutowski et al.

[11] Patent Number: 6,151,494  
[45] Date of Patent: Nov. 21, 2000

[54] METHOD AND APPARATUS FOR OPERATING AND MAINTAINING A WIRELESS COMMUNICATION SYSTEM

[75] Inventors: Neda Lunich Gutowski, Palatine; Susan E. McGill, Barrington, both of Ill.

[73] Assignee: Motorola, Inc., Schaumburg, Ill.

[21] Appl. No.: 09/136,237

[22] Filed: Aug. 19, 1998

[51] Int. Cl.[7] ..................... H04B 7/20
[52] U.S. Cl. ............ 455/424; 455/446; 455/423
[58] Field of Search ................ 455/422, 423, 455/424, 446; 379/32; 345/141, 115

[56] References Cited

U.S. PATENT DOCUMENTS

| | | | |
|---|---|---|---|
| 5,095,500 | 3/1992 | Tayloe et al. | 379/424 |
| 5,559,527 | 9/1996 | Quinn | 345/115 |
| 5,608,854 | 3/1997 | Ladedz et al. | 345/441 |
| 5,697,064 | 12/1997 | Okamoto et al. | 455/507 |
| 5,801,707 | 9/1998 | Rolnik et al. | 345/429 |
| 5,920,313 | 6/1999 | Diedrichsen et al. | 345/339 |

*Primary Examiner*—Fan Tsang  
*Assistant Examiner*—Blane J. Jackson  
*Attorney, Agent, or Firm*—Kenneth A. Haas

[57] ABSTRACT

The present invention provides a method and apparatus for gathering, organizing and using information related to the operation and maintenance of a wireless communication system (10) such as a cellular communication system. In accordance with preferred embodiments of the present invention, system information is organized facilitating a causal analysis of the operation of the cellular communication system to achieve desired operating effects. In accordance with further preferred embodiments, causal data is input to a causal analysis knowledge base by modifying a graphic cause and effect diagram (100). The cause and effect diagram (100) maps and models the data within the knowledge base and without requiring the user to possess specialized knowledge of the structure or operation of the knowledge base.

21 Claims, 5 Drawing Sheets

PLEASE PICK THE NAME FOR THE NEW STAT INPUT BLOCK

| SDCCH CONGESTION | BER |
|---|---|
| SDCCH RF LOSS RATE | ICH_USAGE |
| TCH RF LOSS RATE | XXXX_XXX_XXXX |
| CELL TCH ASSIGNMENTS | CPU_USAGE |
| TCH CONGESTION | INTERVAL |
| SDCCH TRAFFIC (ENLARGE) | RF_LOSSES_TCH |
| SDCCH ARRIVAL RATE | INTRA CELL HO REQ |
| SDCCH HOLDING TIME | OK ACC PROC IMAL |
| PAGING LOAD | INTRA_CELL_HO_LOS |
| TCH HOLDING TIME | INTRA_BSS_HO_STM |
| TCH ARRIVAL RATE | INTRA_BSS_HO_STM |
| APPLY | CANCEL |

METHOD AND APPARATUS FOR OPERATING AND MAINTAINING A WIRELESS COMMUNICATION SYSTEM

FIELD OF THE INVENTION

The present invention relates generally to wireless communication systems, and more particularly, to a method and apparatus for operating and maintaining of a wireless communication system.

BACKGROUND OF THE INVENTION

A tremendous amount of engineering and technical knowledge goes into designing, building and implementing a wireless communication system, such as a cellular communication system. Equally impressive is the amount of engineering and technical knowledge required to operate and maintain the communication system once implemented.

A cellular communication system, for example, is a complex network of systems and elements. A minimum number of elements include 1) a radio link to the subscriber units (cellular telephones) which is usually provided by at least one and typically several base transceiver stations (BTS), 2) a communication link between the base transceiver stations, 3) a controller, typically one or more base station controllers or centralized base station controllers (BSC/CBSC), to control communication between and to manage the operation and interaction of the base transceiver stations, 4) a call controller or switch, typically a mobile switching center (MSC), for routing calls within the system, and 5) a link to the land line or public switch telephone system (PSTN) which is usually also provided by the MSC.

Within each of these elements are numerous subsystems and components. For example, a base station will at least include radio frequency power amplifiers, frequency synthesizers, signal converters, modems, power supplies, fans, etc. A CBSC, for example, may include a mobility manager, voice coders, echo cancellers, and may further provide a link to an operations and maintenance center (OMC). The MSC includes systems for switching calls and for providing call related services such as call waiting, call forwarding, voice mail, and the like. Needless to say there are a lot of systems, subsystems, system elements and components that have to function and interact properly for the cellular communication system to work.

When things go wrong in the cellular communication system there are a number of indications. For example, audible and visual indicators (alarms and flashing lights) may activate indicating one or more elements are not functioning properly. Network performance statistics, observed by the cell network operator, may move outside a normal operating range thus indicating that performance of the network is less than optimal and hence suggesting a problem with the system. Each of these indications tell the system operator that something is wrong with the cellular communication system. What these indications do not necessarily tell the operator is what is wrong and how to fix it. And, the large volume of data generated within the communication system and the complexity of the data often exceeds the processing capability of the operators. This leaves the system operators unable to effectively manage the system.

The typical response to a problem is to observe the alarm or alarms, and to react to whatever it is generating the alarm condition. This is known as fault based reaction. Several systems have recently been proposed attempting to automate the fault based reaction process. However, every alarm does not necessarily sound a problem. A situation known as sympathetic alarming may occur where because an alarm condition exists with one element, alarm conditions occur in other elements sometimes only remotely related to the initial alarm condition. Whether an alarm is indicating an actual problem or a sympathetic situation requires additional investigation. The automated fault management systems have attempted, with limited success, to reduce the effect of sympathetic alarms by providing what is known as alarm correlation. But, investigation by the system operator is still required to finally determine the problem with the system.

With years of experience, cell network operators learn that certain observed conditions relating to the operation of the network arise from the occurrence of certain events. Thus, given a set of circumstances, an experienced operator can by observing the condition predict one or more causes of the condition regardless of which alarms are sounding. This knowledge, however, is associated personally with the expert, and is unavailable when the expert is unavailable.

Thus two problems persist. First, how does one in a simple, convenient and reliable manner gather knowledge from the system experts. Second, how can this knowledge be organized such that a non-expert may refer to the knowledge to efficiently operate and manage the communication system.

BRIEF DESCRIPTION OF THE DRAWINGS

FIG. 6 is a chart illustrating causal data types for use in organizing causal data in accordance with the preferred embodiments of the present invention.

DETAILED DESCRIPTION OF THE PREFERRED EMBODIMENTS

The present invention provides a method and apparatus for gathering, organizing and using information related to the operation and maintenance of a wireless communication system such as a cellular communication system. In accordance with preferred embodiments of the present invention, system information is organized facilitating a causal analysis of the operation of the cellular communication system to achieve desired operating effects. In accordance with further preferred embodiments, causal data is input to a causal analysis knowledge base by modifying a graphic cause and effect diagram. The cause and effect diagram maps and models the data within the knowledge base without requiring the user to possess specialized knowledge of the structure or operation of the knowledge base.

Figure 1:
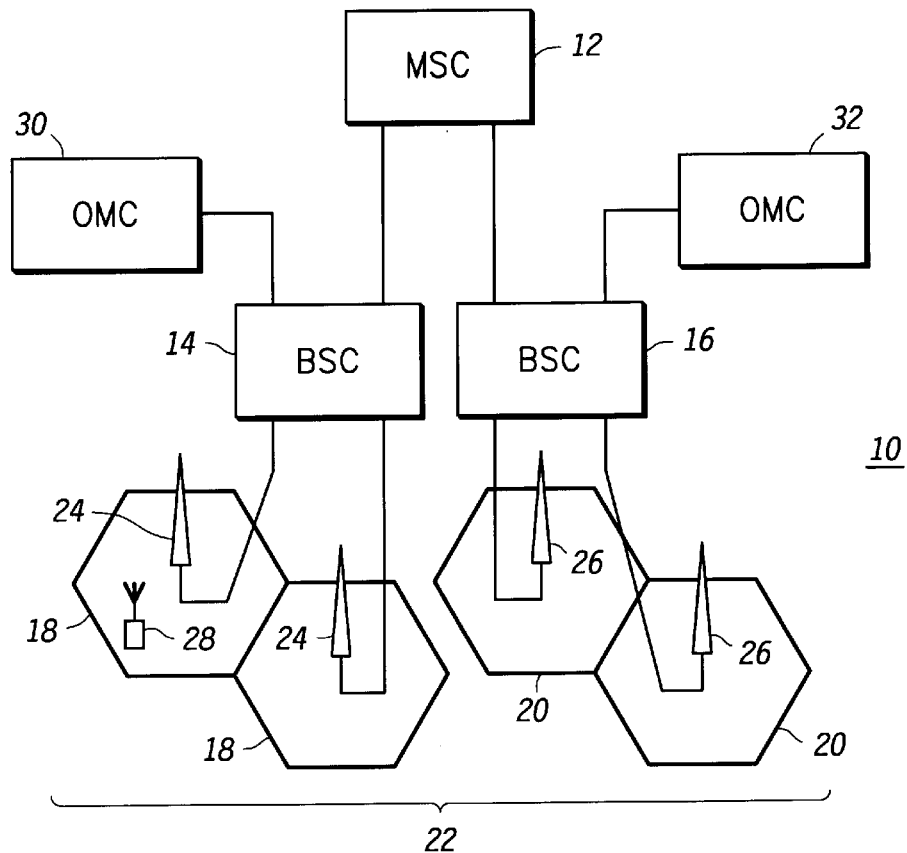
FIG. 1 is a block diagram representation of a wireless communication system including an operation and maintenance center in accordance with a preferred embodiment of the present invention.

The present invention will be described in terms of several preferred embodiments, and particularly, in terms of a wireless communication system operating in accordance with one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the Personal Digital Communications/Personal Communication Systems (PDC/PCS), the IS-55 Time Division Multiple Access digital cellular, the IS-95 Code Division Multiple Access digital cellular and variations and evolutions of these protocols. As shown in FIG. 1, a wireless communication system 10 includes a mobile switching center (MSC) 12, a first base station controller (BSC) 14 and a second BSC 16 servicing a total service area 22. As is known for such systems, each BSC 14 and 16 has associated therewith a plurality of base transceiver stations (BTSs), 24 and 26, respectively servicing communication cells, microcells, picocells and the like, generally shown as cells 18 and cells 20, respectively. It will be appreciated that additional or fewer cells may be implemented as required and without departing from the fair scope of the present invention. MSC 12, BSCs 14 and 16, and BTSs 24 and 26, are specified and operate in accordance with the applicable standard or standards for providing wireless communication services to mobile stations (generally shown as 28) operating in cells 18 and 20.

Figure 2:
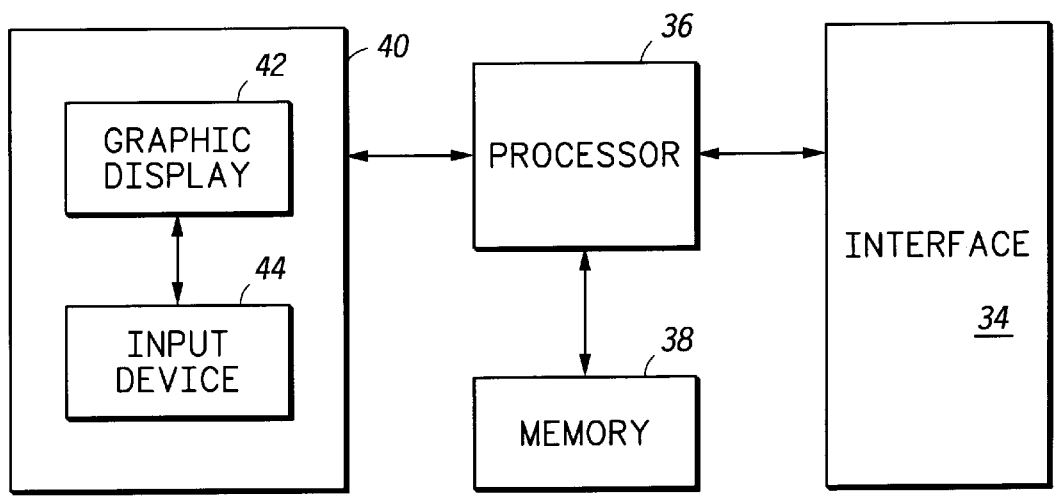
FIG. 2 is a block diagram of the operation and maintenance center shown in FIG. 1.

Also shown in FIG. 1 and coupled respectively to BSC 14 and BSC 16 are an operations and maintenance center (OMC) 30 and an OMC 32. It will be appreciated that a single OMC may service multiple BSCs, and the actual number of OMCs in system 100 will depend on its size. For example, a small system may require only a single OMC to which all of the BSCs are coupled, while a large system may include several OMCs. With reference to FIG. 2, each of OMC 30 and OMC 32 include an interface 34 to wireless communication system 10, and particularly to BSC 14 and BSC 16, respectively. It will be appreciated that each of OMC 30 and 32 may directly or indirectly interface with other elements of wireless communication system 10 or with multiple elements without departing from the fair scope of the present invention. Interface 34 provides a gateway for observing operation of and gathering data from communication system 10. Interface 34 may also provide communication to elements of communication system 10 for controlling, correcting or otherwise effecting their operation. In this regard, interface 34 functions as is well known in the art for such an interface device associated with an OMC of a wireless communication network.

With continued reference to FIG. 2, each of OMC 30 and OMC 32 further include an OMC processor 36 coupled for bidirectional communication with a memory 38. Coupled to processor 36 is a user interface 40 including a graphic display 42 and an input device 44. Each of processor 36, memory 38 and user interface 40 are elements typically associated with an OMC for a wireless communication system and are advantageously adapted for use in accordance with the preferred embodiments of the present invention. It will be appreciated that graphic display 42 is operable for graphically displaying data and is responsive to input signals from input device 44, including for example a keyboard and mouse, for manipulating the graphically displayed data. While it is preferred to arrange processor 36 and memory 38 for use with the present invention, it is possible to provide a separate processor and memory, associated for example with user interface 40, for performing the data processing tasks associated with the present invention.

Memory 38 is arranged to retain in a data structure causal data relating to the operation of wireless communication system 10. Processor 36 is arranged to generate from the causal data a graphic representation of the causal data for display on graphic display 42. As will be discussed, the representation may be modified using input device 44, and processor 36 is further arranged for updating within memory 38 the causal data based upon the modified representation. In this regard, standard data processing, database organization and data storage techniques are used for the storage, retrieval, modification, and revision of the causal data.

Figure 3:
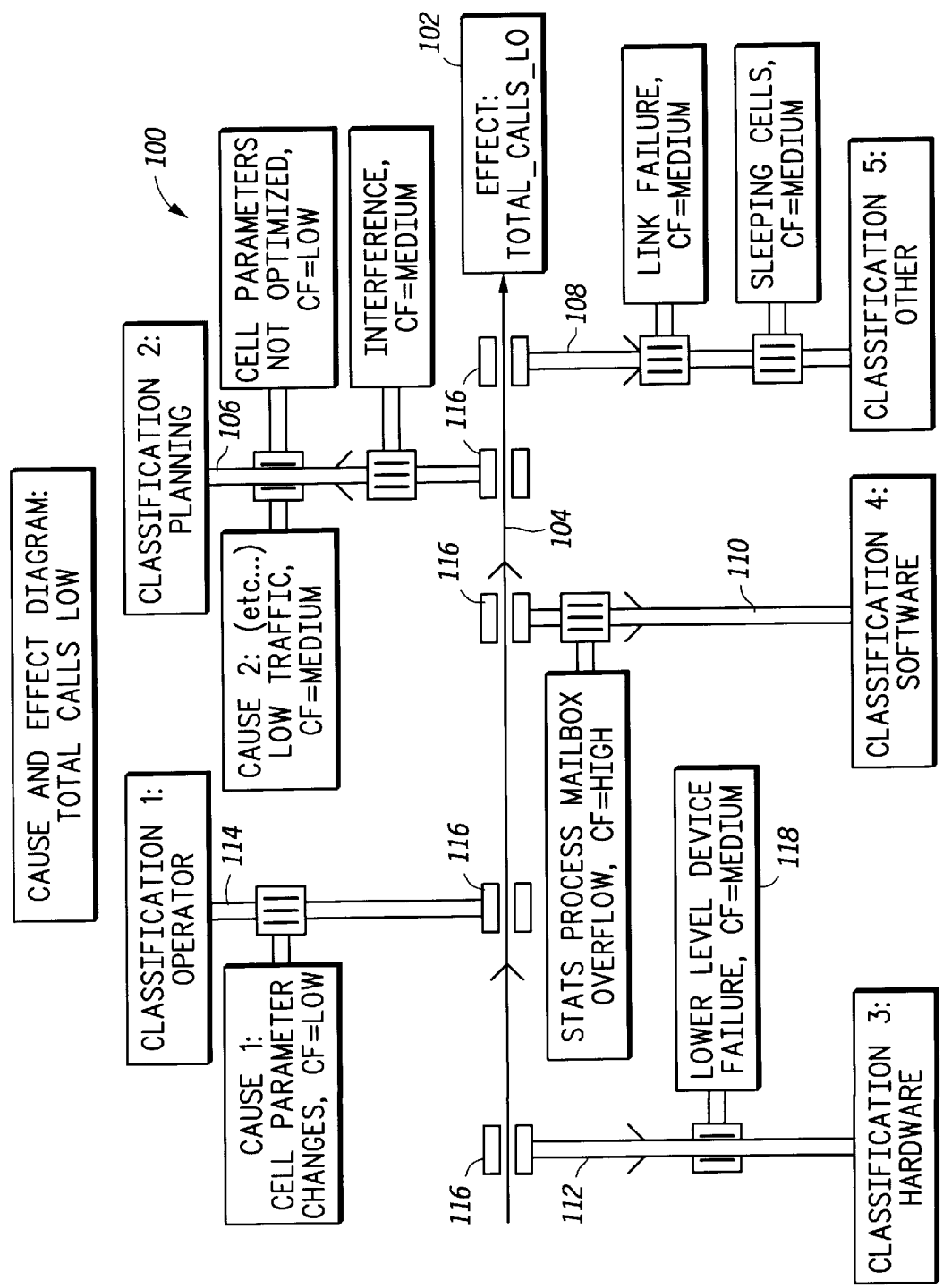
FIG. 3 is a diagram illustrating a causal analysis data structure in accordance with a preferred embodiment of the present invention.

With reference then to FIG. 3, a preferred representation of the causal data is a cause and effect (sometimes referred to as a fishbone) diagram 100. Diagram 100 is preferably modified using drag and drop techniques. As will be described more fully below, an objects pallet 300 (shown in FIG. 5) containing predefined standard objects is provided and utilized by users for both initial data input and modification of the causal data.

Continuing with FIG. 3, system effects are defined for wireless communication system 10 and form a head 102 of diagram 100 with a backbone 104 extending from head 102. The system effects may be operating statistics or other data from which the performance of wireless communication system 10 may be ascertained. Changes observed in the system effects provides an indication of a potential problem that may be further investigated through manipulation of diagram 100. Head 102 is a dialog box in which the system effect is identified using text. Causes for the effect are organized into a plurality of classifications of causes, and each of the classifications of causes form a rib, respectively ribs 106–114 extending outwardly from backbone 104. At a distal end of each rib 106–114, is a dialog box in which the classification of causes associated with the respective rib is identified using text. The proximal end of ribs 106–114 are coupled to backbone 104 using a linking element 116 selected from objects pallet 300. It will be appreciated, and it is appropriate at this point to note, that the various effects, classification of causes and as will be discussed, causes and conditions will vary for each particular wireless communication system. Diagram 100 formed from standardized objects and using standardized linking elements selected from objects pallet 300 provides a uniform method for inputting, displaying, evaluating and manipulating causal data associated with wireless communication system 10. Still continuing with FIG. 3, causes, one of which is shown as 118, are linked to the rib 106–114 of its respective classification of causes again using a linking element 116. Causes 118 are represented graphically using a dialog box containing descriptive text. As will be appreciated from the foregoing discussion, each system effect is easily and uniformly associated with a plurality of causes in an easy to read and understand graphic format. Processor 36 operates on the representation to transform the representation into the causal data for storage within the data structure of memory 38. In this regard, processor 36 preferably uses available data processing and data base storage techniques. Similarly, processor 36 is operable to retrieve causal data from memory 38 and to recreate the graphic representation.

Figure 4:
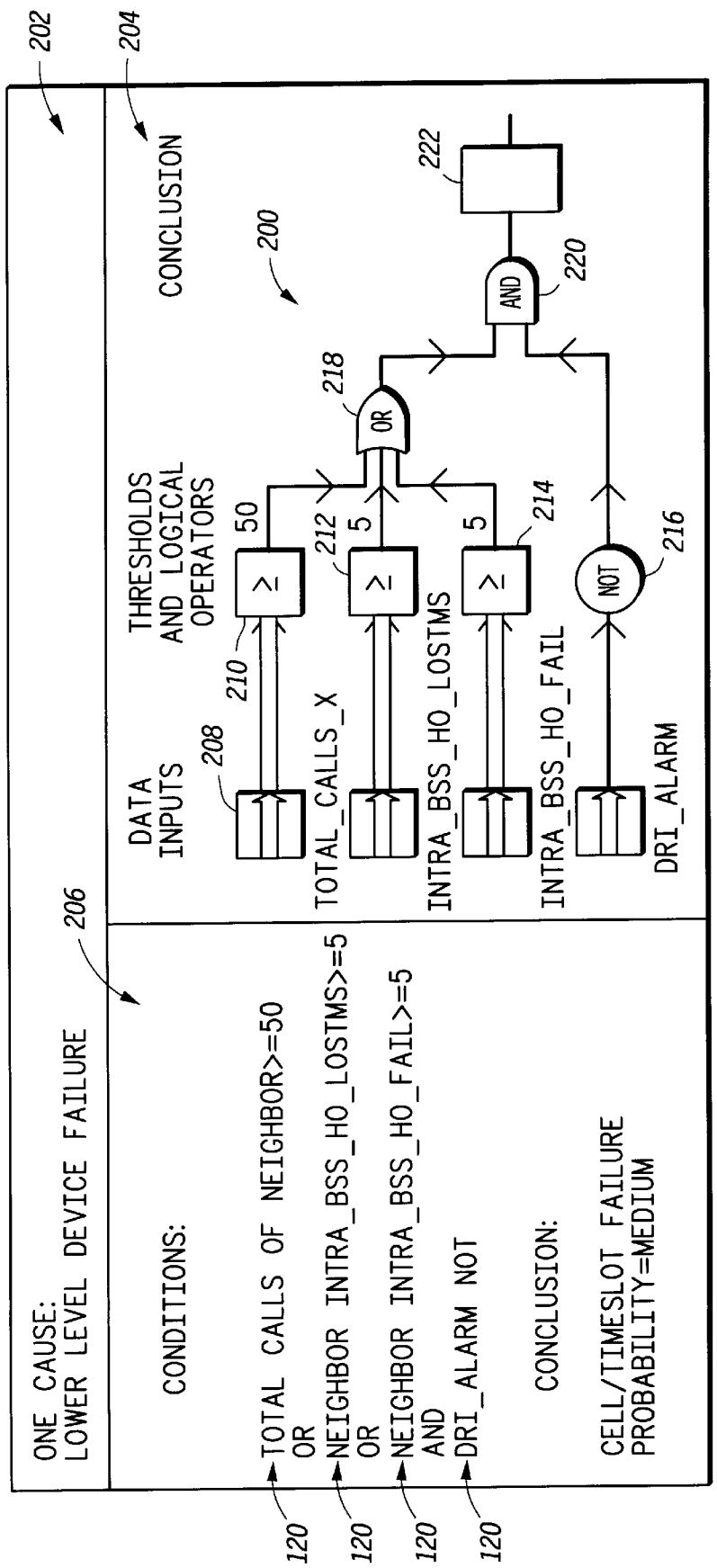
FIG. 4 is a diagram further illustrating the causal analysis data structure in accordance with a preferred embodiment of the present invention.

Associated with each cause 118 is condition data. The condition data allows for the evaluation of causes as a most likely, or most probable cause of a specific effect. With reference to FIG. 4, condition data 120 is arithmetically and logically linked to cause 118 again using user interface 40. In accordance with a preferred embodiment of the present invention a cause 118 is selected using input device 44. For example, a point and click selection process within diagram 100 may be used. Selecting a cause produces a cause analysis chart 200 illustrated in FIG. 4. The cause analysis chart 200 includes in addition to a title 202, a graphic portion 204 and a text portion 206. Using objects pallet 300, the conditions are arithmetically and logically linked to the cause. As shown in FIG. 4, each condition is illustrated as a data input, one of which is shown as 208. Each of the data inputs 208 are combined using logical operators 210, 212, 214, 216, 218 and 220 to provide a conclusion 222. Again it is preferred to use drag and drop techniques to generate graphic portion 204. Processor 36 is operable upon graphic portion 204 to generate text portion 202 by association of the graphic element with a text description and then listing the text descriptions. Likewise, if the user prefers to use text description input, text portion 202 may be entered and processor 36 is operable to generate graphic portion 204.

Figure 5:
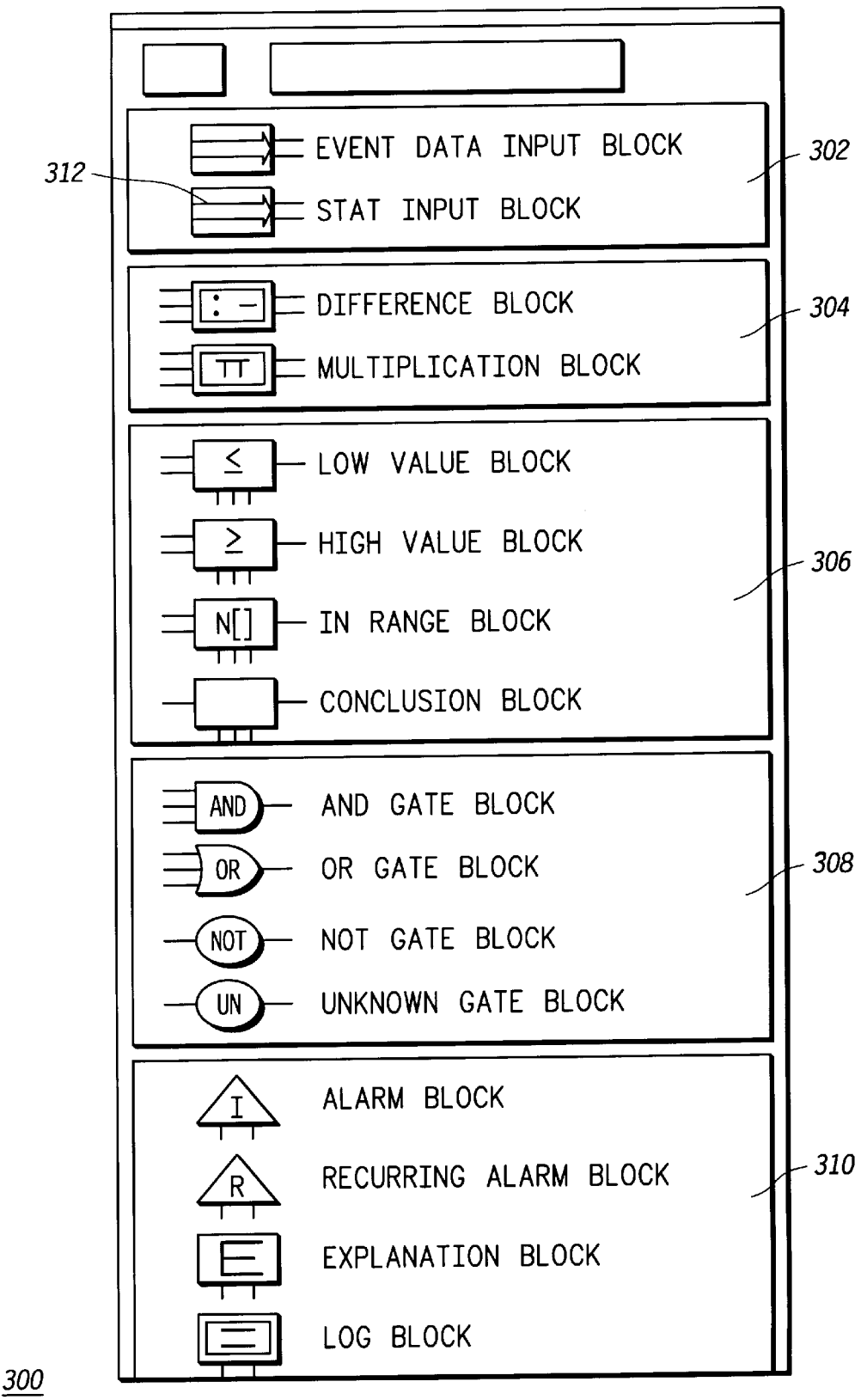
FIG. 5 is a chart illustrating an objects pallet for use in organizing causal data in accordance with a preferred embodiment of the present invention.

With reference to FIG. 5, an exemplary collection of objects, one shown as 312, forming objects pallet 300 are shown. Objects pallet 300 contains standard representations for the particular wireless communication system type being evaluated. For example, objects pallet 300 is suitable for use with a GSM based wireless communication system while a system in accordance with the IS-95 code division multiple access standard may have a different objects pallet. Several standard classes of objects include input 302, arithmetic operations 304, range operations 306 and logical operations 308. A group of objects shown in FIG. 5 as special 310, provides for customization of objects pallet 300 for a particular communication system. In accordance with the present invention, objects 312 are selected from objects pallet 300 in a drag and drop manner and are interconnected to form diagram 100 and chart 200, respectively, for each system effect and for each cause related to a system effect. Processor 36 is operable on each diagram 100 and chart 200 to create and store the causal data in memory 38. Thus, the user need not know the manner in which the causal data is stored or maintained, but merely needs to be able to graphically manipulate diagram 100 and chart 200.

Additional objects pallets, for example causes pallets, provide standard representations for the various elements required to construct the diagrams 100 and charts 200 to fully represent the system being evaluated. The objects pallets are logically linked so that selection of an object from a first pallet will lead the user to the appropriate next pallet. For example, after selecting a stat input block object 312 from pallet 300 the user is presented a pallet 400, FIG. 6, from which to select stat input type data. This type of linking provides standard, uniform data entry that facilitates system analysis.

A diagram 100 is generated for each system effect. Similarly a chart 200 is generated for each cause. Thus, there will be causal data from numerous diagrams 100 and charts 200 stored in memory 38. A problem space map is preferably created to assist in locating the correct context, i.e., a system effect, for graphically creating causal data and for locating the causal relationships during operation and maintenance of wireless conmmunication system 10. The problem space map is collection of diagrams 100 which can be navigated in a manner similar to the above described navigation of diagram 100 to view and evaluate charts 200.

As will be appreciated, the present invention provides an effective tool for the operation and maintenance of wireless communication system 10. In a preferred mode of operation, data, including performance statistics and operating conditions are obtained directly from wireless communication system 10 via interface 34. When a particular system effect is observed from the data, the causal data may be evaluated to determine a most probable cause. In this regard, processor 36 is arranged to associate the performance statistics and operating condition data with the causal data. When a particular system effect is observed, the causal data, i.e., diagram 100, for that system effect, is represented graphically. The system operator is then able to graphically observe the causal data. Where a particular cause of the system effect is suspected, chart 200 for that cause is represented graphically. The associated condition data for that cause is then compared to the actual operating condition data to determine a probability that the particular cause is the actual cause of the system effect. Appropriate corrective action is then taken if there is a high probability of being the actual cause or is avoided if the cause has a low probability of being the actual cause.

As will be further appreciated, identification of high probability causes may be automated. Processor 36 is arranged to evaluate the causal data with respect to the performance statistics and operating data to identify the existence of system effects and to flag high probability causes. The system effects are represented to the operator using graphic display 42 with suspected causes highlighted. The operator can verify suspected causes by viewing and evaluating chart 200 for the cause. Processor 36 accomplishes this by evaluating the operating condition data in accordance with the arithmetic and logical association set forth in the chart 200 for the particular cause.

Modification of the causal data is facilitated via user interface 40. When additional knowledge relating to system effects, causes and conditions is obtained, existing causal data is modified by first viewing the appropriate diagram 100 for the system effects. Causes are added using drag and drop techniques from objects pallet 300, and a chart 200 is completed for the added causes again using objects pallet 300 and drag and drop techniques. Causes are removed in a similar manner. Processor 36 is operable on the modified diagrams 100 to revise and update the causal data stored in memory 38.

Many changes and modifications could be made to the invention without departing from the fair scope and spirit thereof. The scope of some changes is discussed above. The scope of others will become apparent from the appended claims.

We claim:

1. A method for operating and maintaining a wireless communication system comprising the steps of:

providing causal data for the wireless communication system, the causal data relating a plurality of causes to a plurality of system effects;

graphically representing the causal data in the form of a diagram using a user interface;

manipulating the diagram to evaluate the causal data to identify a likely cause for an observed system effect;

organizing the plurality of causes according to at least one classification of causes representing each of the plurality of system effects as a fishbone diagram, the fishbone diagram including a backbone; and representing the at least one classification of causes as a rib extending from the backbone.

2. The method of claim 1, comprising the steps of:

graphically modifying the diagram to form a modified diagram, and revising the causal data based upon the modified diagram.

3. The method of claim 1, wherein the diagram comprises a fishbone diagram.

4. The method of claim 1, wherein the step of graphically representing the causal data comprise:

providing an objects pallet, and representing each of the plurality of causes using an object selected from the objects pallet.

5. The method of claim 1 comprising the steps of:

identifying for each of the plurality of causes at least one condition, and evaluating the at least one condition to determine the likely cause.

6. The method of claim 1, comprising the steps of:

identifying for each of the plurality of causes a plurality of conditions; and associating the plurality of conditions to determine the likely cause.

7. The method of claim 6 wherein the step of associating the plurality of conditions comprises at least one of arithmetically linking and logically linking the plurality of conditions.

8. The method of claim 1 wherein the step of manipulating the diagram comprises obtaining from the wireless communication system operating data, and associating the operating date with the plurality of causes.

9. In a wireless communication system, an operation and maintenance center comprising:

a memory, the memory including a causal data structure containing causal data;

a user interface, the user interface including a graphic display and an input device; and a processor coupled to each of the memory and the user interface, the processor arranged for generating on the graphic display a graphic representation of the causal data the user interface arranged to permit modification of the graphic representation via the input device to create a modified graphic representation and the processor arranged to revise the casual data to reflect the modified graphic representation;

wherein the causal data comprising effects data and causes data.

10. The wireless communication system of claim 9, the memory comprising an objects pallet data structure containing an objects pallet, the causal representation being generated from the causal data and the objects pallet data.

11. The wireless communication system of claim 9, the memory comprising an objects pallet data structure containing objects pallet, the modified graphic representation being generated from the causal data and the objects pallet.

12. The wireless communication system of claim 11, the objects pallet comprising a plurality of standard data inputs and standard linking elements.

13. The wireless communication system of claim 9, the causal data comprising classifications of causes data and the causal data being organized in association with the classifications of causes data.

14. The wireless communication system of claim 13, the graphic representation comprising a plurality of graphic representations based upon the effects data.

15. The wireless communication system of claim 14, the plurality of graphic representations being organized into a problem space map.

16. The wireless communication system of claim 9, the causal data comprising conditions data, each of the conditions data being associated with an operating condition of the wireless communication system.

17. The wireless communication system of claim 16, the causal data comprising conclusion data, the conclusion data associating the condition data and the causal data to identify a probable specific cause.

18. A method of obtaining operation and maintenance data for a wireless communication system comprising the steps of:

providing a user interface including a graphic display and an input device;

identifying at least one system effect and using an objects pallet and the input device, representing the system effect on the graphic display;

for the at least one system effect, identifying a plurality of cause classifications, and using the objects pallet and the input device, revising the graphic data to represent the cause classifications;

for each cause classification, identifying at least one cause, and using the objects pallet and the input device, graphically linking the cause to the cause classification;

determining a plurality of conditions associated with the at least one cause, and using the object pallets and the input device, graphically linking the plurality of conditions to the cause;

processing the graphic display to generate causal data;

storing the causal data in a memory.

19. The method of claim 18 comprising the steps of:

retrieving the causal data; and using the causal data to generate the graphic display.

20. The method of claim 18, wherein the step of graphically linking the plurality of conditions comprises, arithmetically linking and logically linking the conditions.

21. The method of claim 18, further comprising the steps of:

obtaining from the wireless communication system operating data; and using the graphic display to operate and maintain the wireless communication system.

* * * * *